United States Patent
Albright et al.

(10) Patent No.: US 11,155,370 B2
(45) Date of Patent: Oct. 26, 2021

(54) SPACECRAFT LANDING AND RECOVERY INFLATION SYSTEM

(71) Applicant: The Boeing Company, Chicago, IL (US)

(72) Inventors: Justin G. Albright, La Mirada, CA (US); John R. McCann, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 16/596,885

(22) Filed: Oct. 9, 2019

(65) Prior Publication Data
US 2020/0039667 A1 Feb. 6, 2020

Related U.S. Application Data

(63) Continuation of application No. 14/668,589, filed on Mar. 25, 2015, now Pat. No. 10,479,533.

(51) Int. Cl.
*B64G 1/62* (2006.01)
*B64G 1/22* (2006.01)

(52) U.S. Cl.
CPC .......... *B64G 1/62* (2013.01); *B64G 2001/224* (2013.01)

(58) Field of Classification Search
CPC .... B64G 1/62; B64G 2001/224; B64D 17/72; B64D 2201/00; B64C 1/34; B64C 25/56
See application file for complete search history.

(56) References Cited

U.S. PATENT DOCUMENTS

| | | | | |
|---|---|---|---|---|
| 1,818,597 A | * | 8/1931 | Adams | B64C 25/56 244/107 |
| 2,711,868 A | * | 6/1955 | Parker | B64C 35/00 244/107 |
| 3,738,597 A | * | 6/1973 | Earl | B64C 25/56 244/1 OOA |
| 3,955,364 A | * | 5/1976 | Lewis | F01N 3/22 60/290 |
| 8,931,739 B1 | * | 1/2015 | Lutke | B64C 1/34 244/123.11 |
| 9,260,192 B2 | * | 2/2016 | Lu | B64D 25/00 |

OTHER PUBLICATIONS

McKinney et al., "Initial Testing of the CST-100 Aerodynamic Deceleration System," *American Institute of Aeronautics and Astronautics, Aerodynamic Deceierator Systems Technology Conference* (2013).
McKinney et al., "Boeing CST-100 Landing and Recovery System Design and Development Testing," *American institute of Aeronautics and Astronautics, Aerodynamic Deceierator Systems Technology Conference* (2013).

\* cited by examiner

*Primary Examiner* — Christopher D Hutchens
(74) *Attorney, Agent, or Firm* — Walters & Wasylyna LLC

(57) ABSTRACT

A landing inflation system may include a compressed gas source, an airbag assembly fluidly coupled to the compressed gas source and configured to receive compressed gas, and a command processor configured to: (1) generate an inflation initiation command signal in response to an initiation signal, (2) generate an inflation cessation command signal in response to a nominal fill pressure signal, and (3) generate a vent command signal in response to an impact pressure signal.

21 Claims, 7 Drawing Sheets

SPACECRAFT LANDING AND RECOVERY INFLATION SYSTEM

PRIORITY

This application is a continuation of U.S. Ser. No. 14/668,589 filed on Mar. 25, 2015.

FIELD

The present disclosure is generally related to landing and recovery systems for a spacecraft and, more particularly, to an inflation system that deploys airbags to attenuate a load from a landing impact of the spacecraft to enable re-use of a space capsule.

BACKGROUND

Landing and recovery of capsule-spacecraft, also known as a space capsule, at the termination of flight may be effected by various different landing and recovery systems designed to attenuate the landing loads upon impact. As examples, space capsules may utilize parachutes, landing thrusters, engines (e.g., retro-rockets), water landings or a combination thereof to effect landing and recovery operations. However, these methods have various disadvantages. As one example, landing thrusters or engines add significant additional weight and complexity to the spacecraft and present risks to the lives of the crew due to the additional failure modes of an actively controlled propulsion system and the hazardous propellant required to be used upon landing. As another example, parachute landings on water can result in high side loads from wave action and result in damage to the space capsule, which, along with salt water induced corrosion, may affect the ability to re-use the space capsule.

Accordingly, those skilled in the art continue with research and development efforts in the field of spacecraft landing and recovery systems.

SUMMARY

In one embodiment, the disclosed landing inflation system may include a compressed gas source, an airbag assembly fluidly coupled to the compressed gas source and configured to receive compressed gas, and a command processor configured to: (1) generate an inflation initiation command signal in response to an initiation signal, (2) generate an inflation cessation command signal in response to a nominal fill pressure signal, and (3) generate a vent command signal in response to an impact pressure signal.

In another embodiment, the disclosed spacecraft may include a space capsule, a compressed gas source disposed within the space capsule, and a landing inflation system, the landing system may include an airbag assembly fluidly coupled to the compressed gas source to receive compressed gas, and a command processor configured to: (1) generate an inflation initiation command signal in response to an initiation signal, (2) generate an inflation cessation command signal in response to a nominal fill pressure signal, and (3) generate a vent command signal in response to an impact pressure signal.

In yet another embodiment, the disclosed method for landing and recovery of a space capsule may include the steps of: (1) inflating an airbag assembly with compressed gas during descent of the space capsule, (2) ceasing inflation of the airbag assembly upon reaching a nominal fill pressure, and (3) attenuating a load in response to a landing impact.

Other embodiments of the disclosed systems and method will become apparent from the following detailed description, the accompanying drawings and the appended claims.

DETAILED DESCRIPTION

Figure 1:
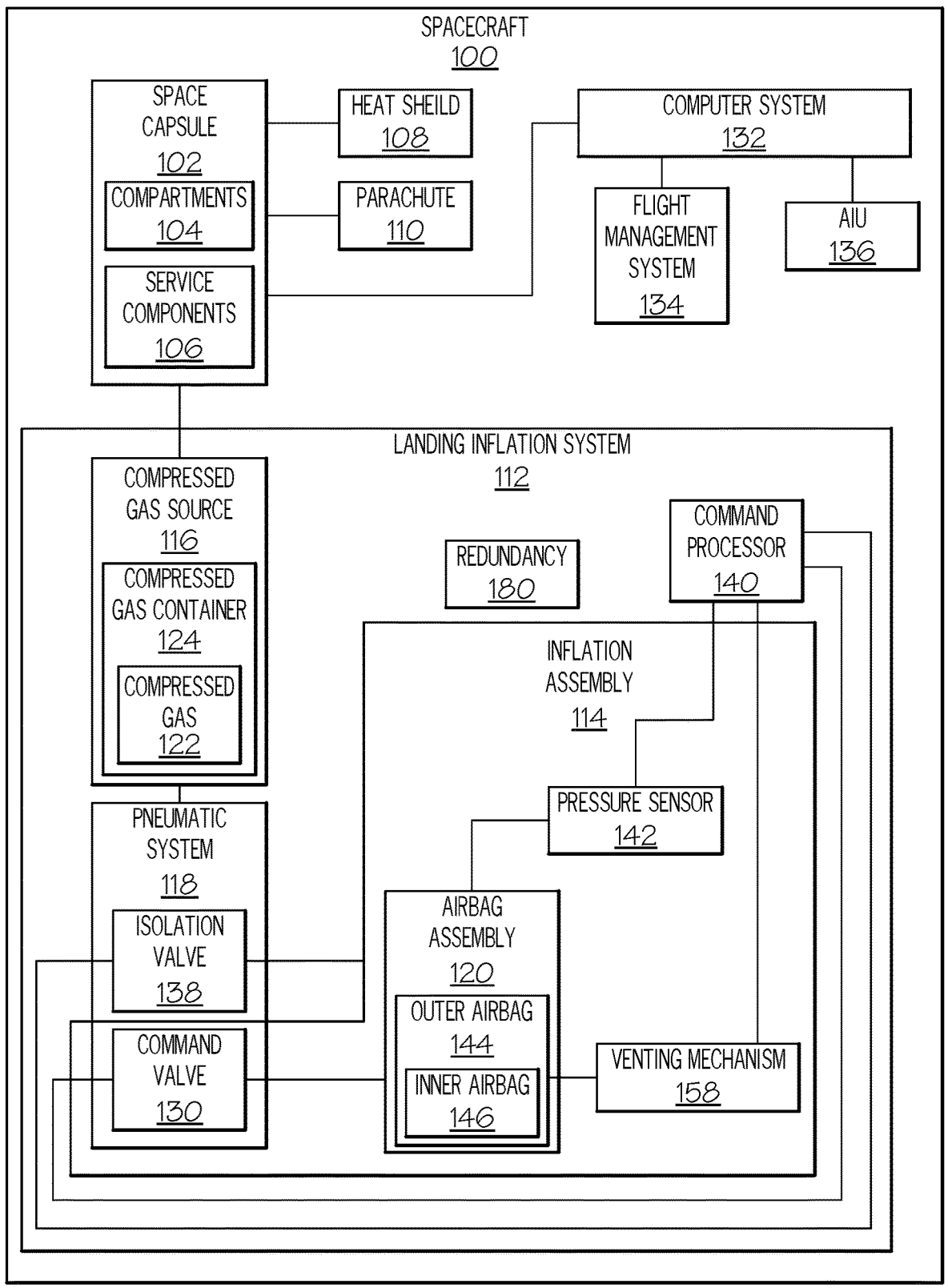
FIG. 1 is a block diagram of one embodiment of the disclosed spacecraft.

The following detailed description refers to the accompanying drawings, which illustrate specific embodiments of the disclosure. Other embodiments having different structures and operations do not depart from the scope of the present disclosure. Like reference numerals may refer to the same or similar elements or components in the different drawings.

Referring to FIG. 1, one example embodiment of the disclosed spacecraft, generally designated 100, may include space capsule 102. Space capsule 102 may be configured to carry humans and/or cargo for return to Earth. Space capsule 102 may include one or more compartments 104 (e.g., a crew compartment, a cargo compartment, etc.) and various service components 106. Service components 106 may include, but are not limited to, flight management systems, spacecraft health and monitoring systems, communications systems, maneuvering thrusters, flight controls, a docking system, an umbilical system and the like.

Spacecraft 100 may further include heat shield 108 (e.g., a forward heat shield) coupled to space capsule 102. Heat shield 108 may shield space capsule 102 from absorbing excessive heat from atmospheric reentry by either dissipating, reflecting or absorbing the heat. Heat shield 108 may be configured to separate from space capsule 102 during descent.

Figure 2:
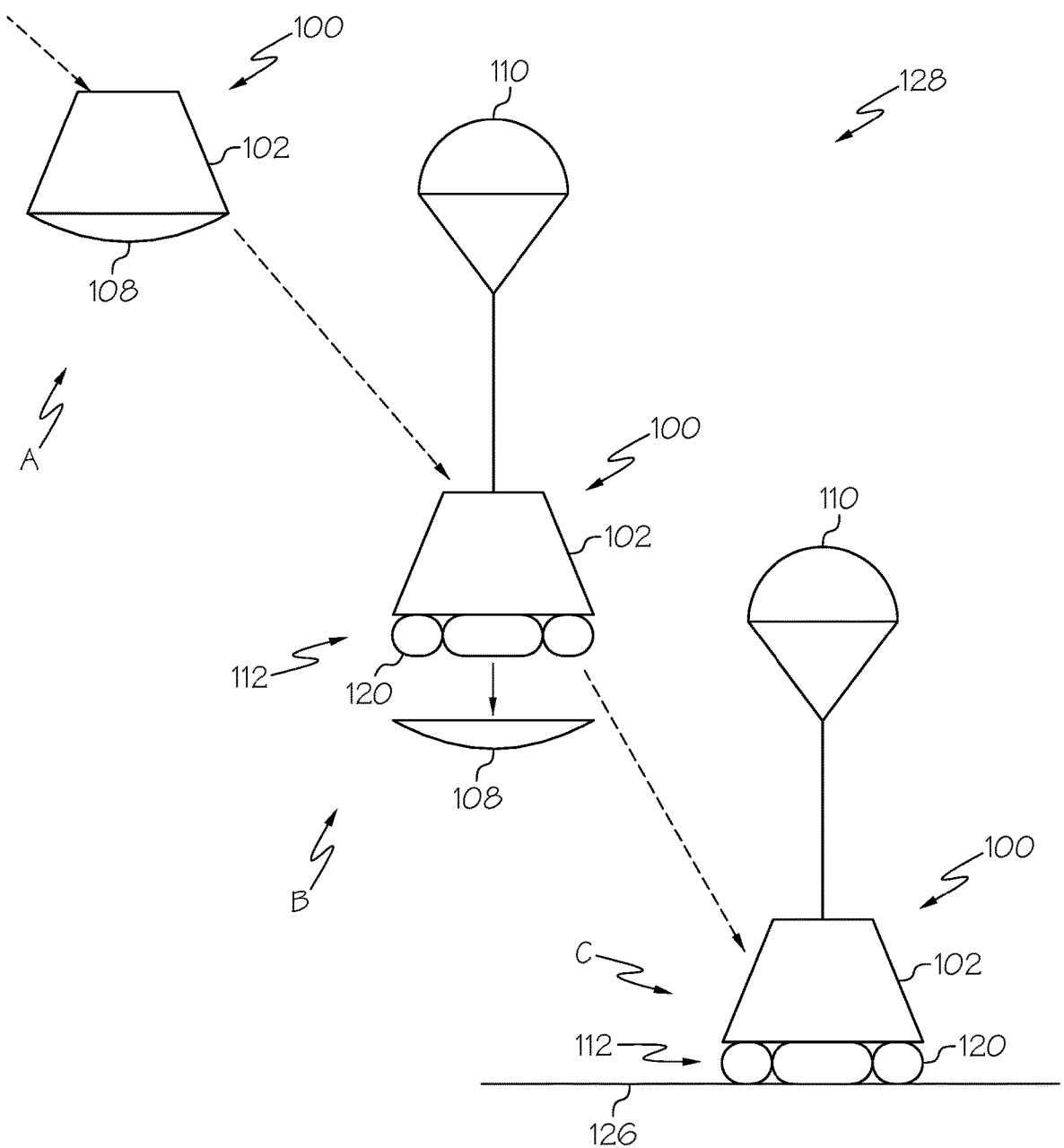
FIG. 2 is a schematic view of a landing and recovery operation of the spacecraft of FIG. 1.

Spacecraft 100 may further include parachute 110 to slow the descent of space capsule 102. Parachute 110 may be coupled to and deployable from space capsule 102. Parachute 110 may be a rapid deployment parachute (e.g., deployed by mortar or rocket extraction) or may be a drogue parachute. While only a single parachute 110 is illustrated in FIGS. 1 and 2, those skilled in the aeronautical arts will recognize that any suitable number of parachutes may be used to slow the descent of space capsule 102.

Spacecraft 100 may further include compressed gas source 116. Compressed gas 122 may include any pressurized stored gas. A suitable volume of compressed gas 122 required to inflate airbag assembly 120 may be stored, for example, in compressed gas container 124, on space capsule 102. As one general, non-limiting example, compressed gas 122 may be any gas that is used by space capsule 102. For instance, compressed gas 122 may include a remaining volume of compressed gas not otherwise used by space capsule 102 during normal operation (e.g., flight, orbit, reentry). As another general, non-limiting example, compressed gas 122 may include a gas dedicated to landing cushion system 112. As specific, non-limiting examples, compressed gas 122 may include, but is not limited to, breathable air, a nitrogen and oxygen gas mixture (e.g., Nitrox), clean dry air or the like.

Spacecraft 100 may further include landing inflation system 112. Landing inflation system 112 may include inflation assembly 114. Inflation assembly 114 may include at least one airbag assembly 120. Airbag assembly 120 may be coupled to and deployable from space capsule 102. Airbag assembly 120 may be suitably sized to attenuate impact loads during landing and support space capsule 102 during recovery. Heat shield 108 may be disposed over (e.g., cover) airbag assembly 120, for example, until separation and deployment of airbag assembly 120.

Airbag assembly 120 may be fluidly coupled to compressed gas source 116 to receive compressed gas 122. Inflation of airbag assembly 120 may be affected by distributing compressed gas 122 via pneumatic system 118. Thus, no pyro-explosive mixture is required to inflate airbag assembly 120. Pneumatic system 118 may include various components, for example, pneumatic lines (e.g., pipes, hoses or tubes), valves, fittings and/or other features, to distribute compressed gas 122 to airbag assembly 120.

Landing inflation system 112 may further include command processor 140. Command processor 140 may be configured to control the operational functions of landing inflation system 112. As one example, command processor 140 may be configured to control inflation of airbag assembly 120. In one example embodiment, command processor 140 may be microprocessor-controlled electronic device communicatively coupled to computer system 132. For example, command processor 140 may be an integrated valve controller. In another example embodiment, command processor 140 may be implemented on computer system 132.

Landing inflation system 112 may further include isolation valve 138. Isolation valve 138 may be one example of pneumatic system 118. Isolation valve 138 may be fluidly coupled between compressed gas source 116 and inflation assembly 114. Isolation valve 138 may be configured to isolate inflation assembly 114 from compressed gas source 116 and control a flow of compressed gas 122 to inflation assembly 114. Isolation valve 138 may be communicatively coupled to and controlled by command processor 140.

Inflation assembly 114 may further include command valve 130. Command valve 130 may be one example component of pneumatic system 118. As one non-limiting example, command valve 130 may be an electromechanically operated valve (e.g., a solenoid valve). Command valve 130 may be configured to control a flow of compressed gas 122 to airbag assembly 120 and, thus, control a fill pressure of airbag assembly 120. As one example, command valve 130 may be fluidly coupled between compressed gas source 116 and airbag assembly 120. As another example, command valve 130 may be fluidly coupled between isolation valve 138 and airbag assembly 120. Command valve 130 may be communicatively coupled to and controlled by command processor 140.

Landing inflation system 112 may further include pressure sensor 142. Pressure sensor 142 may be fluidly coupled to airbag assembly 120. Pressure sensor 142 may be configured to measure the fill pressure of airbag assembly 120. Pressure sensor 142 may be communicatively coupled to command processor 140.

Figure 4:
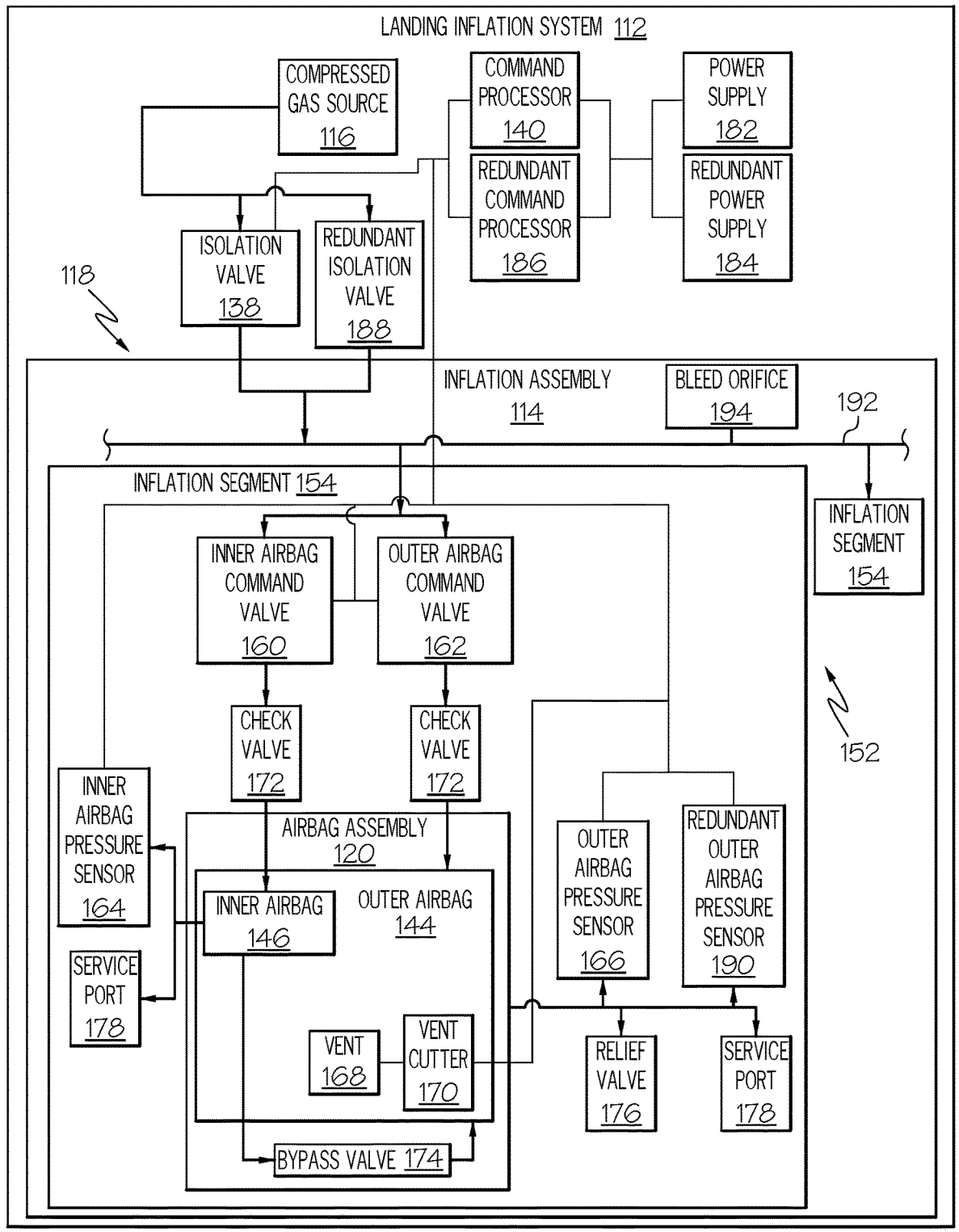
FIG. 4 is a partial block diagram of another embodiment of the disclosed landing inflation system of FIG. 1.

Landing inflation system 112 may further include power supply 182 (FIG. 4). Power supply 182 may provide electrical power to one or more components of landing inflation system 112. As one example, power supply 182 may be a power supply shared by other systems of space capsule 102. As another example, power supply 182 may be a dedicated power supply.

Airbag assembly 120 may include outer airbag 144 and inner airbag 146. Outer airbag 144 may be fluidly coupled to compressed gas source 116. For example, outer airbag 144 may receive first portion 148 (FIG. 3) of compressed gas 122 from command valve 130. Inner airbag 146 may be positioned within (e.g., inside of) outer airbag 144. Inner airbag 146 may be fluidly coupled to compressed gas source 116. For example, inner airbag 146 may receive second portion 150 (FIG. 3) of compressed gas from command valve 130. Outer airbag 144 may be suitably sized to attenuate impact loads during landing. Inner airbag 146 may be suitably sized to support space capsule 102 during recovery (e.g., after impact).

Inflation assembly 114 may further include venting mechanism 158. Venting mechanism 158 may be operably coupled to outer airbag 144. Venting mechanism 158 may be configured to vent (e.g., release or discharge) first portion 148 of compressed gas 122 from outer airbag 144. As one example, venting mechanism 158 may be communicatively coupled to and controlled by command processor 140. As another example, venting mechanism 158 may be configured to automatically vent compressed gas 122 from outer airbag 144, for example, upon impact of space capsule 102.

Spacecraft 100 may further include various systems, control units, control processors, data processing units, data storage units (e.g. memory), data transfer units, data interface units, sensors and the like configured to monitor and/or control various operational functions of spacecraft 100. As specific, non-limiting examples, spacecraft 100 may include flight management system 134, analog interface unit ("AIU") 136 and the like. Flight management system 134 may, for example, interface (e.g., store, analyze and/or communicate data) with various other systems or units of spacecraft 100 during flight. AIU 136 may, for example, interface (e.g., store, analyze and/or communicate data) with sensors of spacecraft 100. In one example embodiment, flight management system 134 and/or AIU 136 may be microprocessor-controlled electronic devices communicatively coupled to computer system 132. In another example embodiment, flight management system 134 and/or AIU 136 may be implemented on computer system 132.

Computer system 132 may be configured to function in accordance with a computer-readable code provided to computer system 132 by way of computer-readable storage media. While not depicted in FIG. 1, those skilled in the computing and control arts will appreciate that such computer-readable storage media may include, but is not limited to, solid-state memory, optical storage media, magnetic storage media, etc. Other suitable forms of computer-readable storage media may also be used in accordance with the particular embodiment of computer system 132. In any case, one or more of the operational functions of space capsule 102 and/or landing inflation system 112 may be implemented, at least in part, by executable program code (e.g., a computer program product) provided to computer system 132, and executable by a data processing system or processor unit, by way of suitable computer-readable storage media.

Generally, computer system 132 may monitor and/or control flight parameters during various phases of flight of spacecraft 100, including landing and recovery operation 128 of space capsule 102 (FIG. 2). As one example, flight management system 134 may initiate deployment of parachute 110, for example, at a predetermined altitude, time, orientation of space capsule 102 or the like. As another example, flight management system 134 may initiate separation of heat shield 108 from space capsule 102, for example, at a predetermined altitude, time, orientation of space capsule 102 or the like. As yet another example, AIU 136 may monitor pressure and/or temperature of compressed gas source 116, for example, of compressed gas 122 in compressed gas container 124 during orbit and/or return to Earth.

The illustrated embodiment of spacecraft 100 in FIG. 1 is not meant to imply physical or architectural limitations to the manner in which different example embodiments may be implemented. Other component in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

FIG. 2 illustrates one example implementation of landing and recovery operation 128 of spacecraft 100. As illustrated in portion A of landing and recovery operation 128, space capsule 102 may return to Earth. As illustrated in portion B of landing and recovery operation 128, parachute 110 may deploy and heat shield 108 may separate from space capsule 102 to expose airbag assembly 120. Heat shield 108 may separate from space capsule 102 prior to, during or following deployment of parachute 110. As one non-limiting example, heat shield 108 may separate from space capsule 102 at a predetermined altitude, for example, approximately 3,000 feet (900 meters). Parachute 110 may be deployed at a predetermined altitude, for example, approximately 8,000 feet (2,400 meters). Following separation of heat shield 108, airbag assembly 120 may be inflated (e.g., filled) with compressed gas 122 during descent of space capsule 102. As illustrated in portion C of landing and recovery operation 128, airbag assembly 120 may attenuate the impact loads upon landing on ground surface 126.

Referring to FIG. 1, and with reference to portion C of FIG. 2, upon impact, venting mechanism 158 may allow compressed gas 122 to be discharged from outer airbag 144 to attenuate the impact loads. Inner airbag 146 may remain inflated to support space capsule 102 for recovery.

Landing and recover operation 128 may illustrate a planned landing or an emergency landing (e.g., due to abortion of the launch of spacecraft 100). Landing inflation system 112 may be configured to inflate airbag assembly 120 within a predetermined inflation duration. As one non-limiting example, inflation duration may be between approximately 30 seconds and 3 minutes, for example, during a planned landing. As another non-limiting example, inflation duration may be less than approximately 60 seconds, for example, during a planned landing. As yet another non-limiting example, inflation duration may be less than approximately 30 seconds, for example, during an emergency landing.

Figure 3:
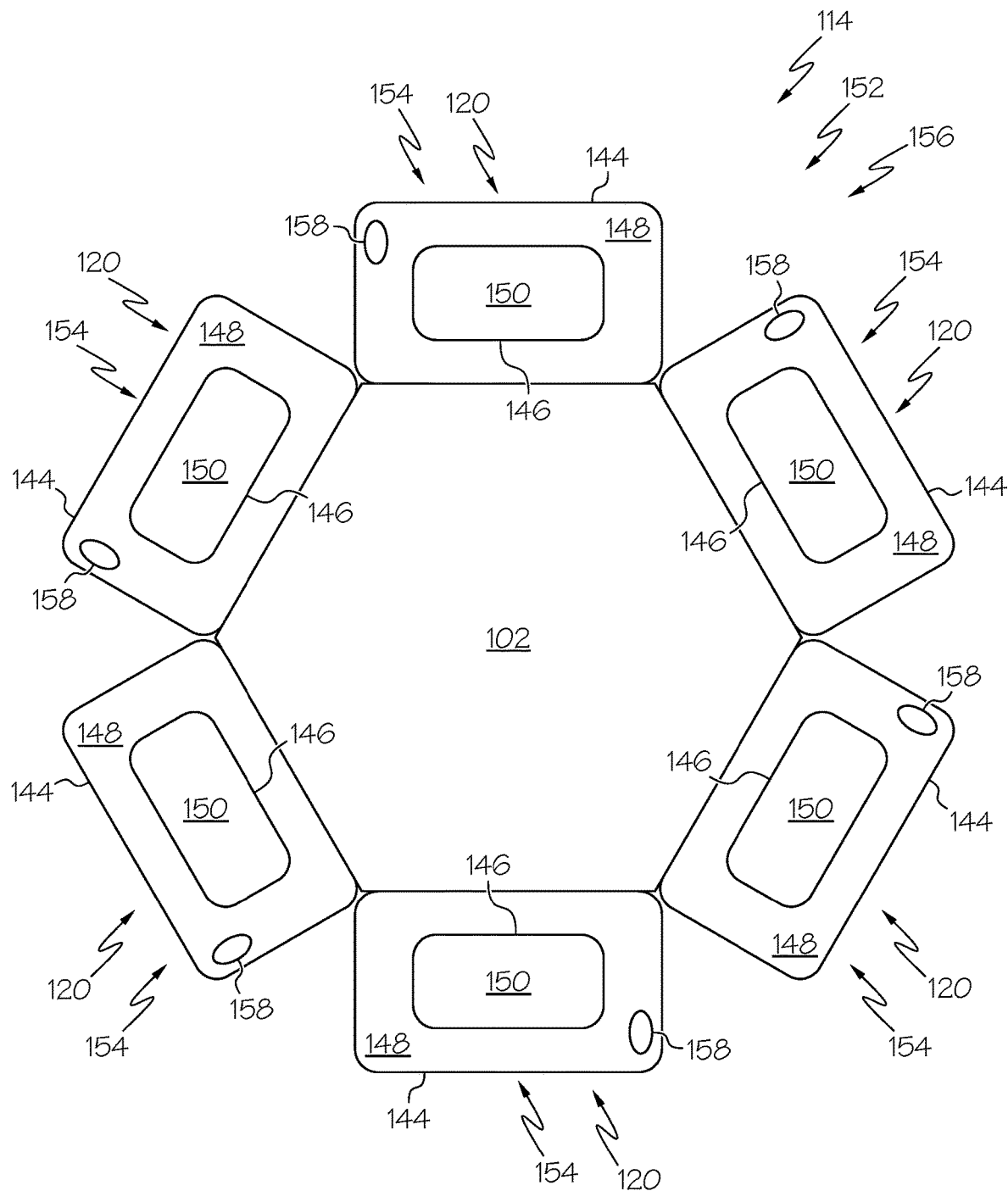
FIG. 3 is a schematic plan view of one embodiment of the disclosed landing inflation system of FIG. 1.

Referring to FIG. 3, inflation assembly 114 may include plurality of airbag assemblies 156. Each airbag assembly 120 of plurality of airbag assemblies 156 may include outer airbag 144 and inner airbag 146. Each airbag assembly 120 may be fluidly isolated from any other airbag assembly 120 of plurality of airbag assemblies 156. Each airbag assembly 120 may include an associated command valve 130 (FIG. 2) configured to control the flow of compressed gas 122 (FIG. 2) to each airbag assembly 120 and, thus, control the fill pressure of each airbag assembly 120. Each airbag assembly 120 may include an associated pressure sensor 142 (FIG. 2) configured to measure the fill pressure of each airbag assembly 120.

Thus, associated command valve 130, pressure sensor 142 and airbag assembly 120 may define inflation segment 154 of inflation assembly 114. Inflation assembly 114 may include plurality of inflation segments 152.

Outer airbag 144 of each airbag assembly 120 may include venting mechanism 158 configured to release compressed gas 122 from associated outer airbag 144. While each airbag assembly 120 is illustrated having only one venting mechanism 158 associated with outer airbag 144, other numbers of venting mechanisms 158 (e.g., two) are also contemplated.

As one specific, non-limiting example, and as illustrated in FIG. 3, inflation assembly 114 may include six airbag assemblies 120 and, for example, six inflation segments 154. Other numbers of airbag assemblies 120 and/or inflation segments 154 are also contemplated. As one example, plurality of airbag assemblies 156 may include less than six airbag assemblies 120 (e.g., two, three, four, five). As another example, plurality of airbag assemblies 156 may include more than six airbag assemblies (e.g., seven, eight, nine, ten, etc.) Thus, inflation assembly 114 (e.g., the number of airbag assemblies 120) may be scalable depending upon, for example, the size of space capsule, the weight or space capsule, the impact load to be attenuated and the like.

While not explicitly illustrated, inflation assembly 114 may include one (e.g., torus-shaped) airbag assembly 120. For example, a single airbag assembly 120 may include one outer airbag 144 and a plurality of inner airbags 146 positioned within (e.g., inside of) the single outer airbag 144.

Referring to FIG. 4, each inflation segment 154 of plurality of inflation segments 152 may include inner airbag command valve 160 and outer airbag command valve 162. Inner airbag command valve 160 and outer airbag command valve 162 may be examples of command valve 130 (FIG. 1).

Outer airbag command valve 162 may be configured to control a flow of compressed gas 122 (e.g., first portion 148) to outer airbag 144 and, thus, control a fill pressure of outer airbag 144. As one example, outer airbag command valve 162 may be fluidly coupled between compressed gas source 116 and outer airbag 144. As another example, and as illustrated in FIG. 4, inner airbag command valve 160 may be fluidly coupled between isolation valve 138 and outer airbag 144. Outer airbag command valve 162 may be communicatively coupled to and controlled by command processor 140.

Inner airbag command valve 160 may be configured to control a flow of compressed gas 122 (e.g., second portion 150) to inner airbag 146 and, thus, control a fill pressure of inner airbag 146. As one example, inner airbag command valve 160 may be fluidly coupled between compressed gas source 116 and inner airbag 146. As another example, and as illustrated in FIG. 4, inner airbag command valve 160 may be fluidly coupled between isolation valve 138 and inner airbag 146. Inner airbag command valve 160 may be communicatively coupled to and controlled by command processor 140.

Check valve 172 may be fluidly coupled between inner airbag command valve 160 and inner airbag 146. Check valve 172 may also be fluidly coupled between outer airbag command valve 162 and outer airbag 144. Check valve 172 may be one example component of pneumatic system 118. As one non-limiting example, check valve 172 may be a one-way valve.

Each inflation segment 154 of plurality of inflation segments 152 may include inner airbag pressure sensor 164 and outer airbag pressure sensor 166. Inner airbag pressure sensor 164 and outer airbag pressure sensor 166 may be examples of pressure sensor 142 (FIG. 1).

Inner airbag pressure sensor 164 may be fluidly coupled to inner airbag 146. Inner airbag pressure sensor 164 may be configured to measure the fill pressure of inner airbag 146. Inner airbag pressure sensor 164 may be communicatively coupled to command processor 140.

Outer airbag pressure sensor 166 may be fluidly coupled to outer airbag 144. Outer airbag pressure sensor 166 may be configured to measure the fill pressure of outer airbag 144. Outer airbag pressure sensor 166 may be communicatively coupled to command processor 140.

Airbag assembly 120 may include vent 168. Airbag assembly may further include vent cutter 170. Vent 168 and vent cutter 170 may be an example of venting mechanism 158 (FIG. 1). Vent 168 may be configured to releasably seal outer airbag 144. Vent cutter 170 may be configured to release (e.g., unseal) vent 168 and discharge compressed gas 122 (e.g., first portion 148) from outer airbag 144, for example, upon impact to attenuate impact loads. As one non-limiting example, vent 168 may include an aperture formed through outer airbag 144 and a releasable flap or a plurality of flaps configured to seal (e.g., cover) the aperture. For instance, one or more flaps may be connected to each other and/or to the body of the outer airbag 144, for example, by a severable cord or cable, in order to seal vent 168. Vent 168 may be resealable. For example, replacement cords may be coupled to the flaps to reseal vent 168. Vent cutter 170 may include an actuated cutting mechanism configured to cut the cord and/or the flap and release (e.g., uncover) the aperture (e.g., open vent 168). As one general, non-limiting example, vent cutter 170 may include an ordinance cord cutter. Vent cutter 170 may be communicatively coupled to and controlled by command processor 140. As one specific, non-limiting example, airbag assembly 120 (e.g., including vent 168 and vent cutter 170) may be a load attenuation airbag assembly commercially available from ILC Dover of Frederica, Del. Such an example commercially available airbag assembly may include an integral vent (e.g., cord connected and resealable flaps) and a vent cutter (e.g., vent 168 and vent cutter 170). Further, vent cutter may be a commercially available replaceable and/or repairable component, for example, available from Roberts Research Lab of Torrance, Calif.

As another non-limiting example, vent 168 may be configured to automatically open (e.g., unseal, tear apart, pop, etc.) in response to a sudden and/or extreme increase in the fill pressure of outer airbag 144, for example, upon impact of space capsule 102 with ground surface 126 (FIG. 2). In such an example, control from command processor 140 may be unnecessary.

Inner airbag 146 may be fluidly coupled to outer airbag 144. Bypass valve 174 may be fluidly coupled between inner airbag 146 and outer airbag 144. Bypass valve 174 may be one example component of pneumatic system 118 (FIG. 1). As one non-limiting example, bypass valve 174 may be a one-way valve. Fluidly coupling inner airbag 146 to outer airbag 144 may allow compressed gas 122 to flow from inner airbag 146 to outer airbag 144, for example, to prevent over inflation of inner airbag 146. Fluidly coupling inner airbag 146 to outer airbag 144 may be one example of a latency feature of landing inflation system 112. For example, when inner airbag 146 is fully inflated before inner airbag pressure sensor 164 indicates complete inflation and/or before inner airbag command valve 160 ceases inflation (e.g., closes), excess compressed gas 122 may be distributed to outer airbag 144.

Relief valve 176 may be fluidly coupled to outer airbag 144. Relief valve 176 may be one example component of pneumatic system 118 (FIG. 1). Relief valve 176 may be another example of a latency feature of landing inflation system 112. For example, when outer airbag 144 is fully inflated before outer airbag pressure sensor 166 indicates complete inflation and/or before outer airbag command valve 162 ceases inflation (e.g., closes), excess compressed gas 122 may be discharged through relief valve 176.

Inner airbag 146 and/or outer airbag 144 may include service port 178. Service port 178 may allow for maintenance and/or service to inner airbag 146, outer airbag 144 and/or pneumatic system 118 (FIG. 1).

The illustrated embodiment of landing inflation system 112 in FIG. 4 is not meant to imply physical or architectural limitations to the manner in which different example embodiments may be implemented. Other component in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Referring to FIG. 1, and with reference to FIG. 4, landing inflation system 112 may include at least one redundancy 180. Redundancy 180 may be configured to accommodate a failure mode of one or more of airbag assembly 120, command processor 140, command valve 130 and/or pressure sensor 142. As non-limiting examples, redundancy 180 may include redundant power supply 184, redundant command processor 186, redundant isolation valve 188 and/or redundant outer airbag pressure sensor 190. Additional airbag assemblies 120 and/or inflation segments 154 above a minimum required number to suitably attenuate the landing loads may be another example of redundancy 180.

Redundant command processor 186 may be configured to at least partially control the operational functions of landing inflation system 112. As one example, redundant command processor 186 may be configured to control inflation of airbag assembly 120 in cooperation with command processor 140 or in response to failure of command processor 140.

Redundant isolation valve 188 may be fluidly coupled between compressed gas source 116 and inflation assembly 114. Redundant isolation valve 188 may be configured to isolate inflation assembly 114 from compressed gas source 116 and control a flow of compressed gas 122 to inflation assembly 114 in response to failure of isolation valve 138. Redundant isolation valve 188 may be communicatively coupled to and controlled by command processor 140 and/or redundant command processor 186.

Redundant outer airbag pressure sensor 190 may be fluidly coupled to outer airbag 144. Redundant outer airbag pressure sensor 190 may be configured to measure the fill pressure of outer airbag 144 in cooperation with outer airbag pressure sensor 166 or in response to failure of outer airbag pressure sensor 166. Redundant outer airbag pressure sensor 190 may be communicatively coupled to command processor 140 and/or redundant command processor 186.

Inflation assembly 114 may include manifold 192. Manifold 192 may be fluidly coupled to isolation valve 138 and/or redundant isolation valve 188. Manifold 192 may be one example component of pneumatic system 118 (FIG. 1). Manifold 192 may be configured to distribute compressed gas 122 (FIG. 1) to each inflation segment 154 of plurality of inflation segments 152.

Manifold 192 may include bleed orifice 194. Bleed orifice 194 may be configured to prevent head pressure build up in pneumatic system 118 (FIG. 1) before airbag assembly 120 (e.g., outer airbag 144 and/or inner airbag 146). For example, bleed orifice 194 may be configured to discharge excess pressure in manifold 192, for example, pressure created during ascent to Earth orbit, which may then be equalized within pneumatic system 118 upon return to Earth.

Figure 5:
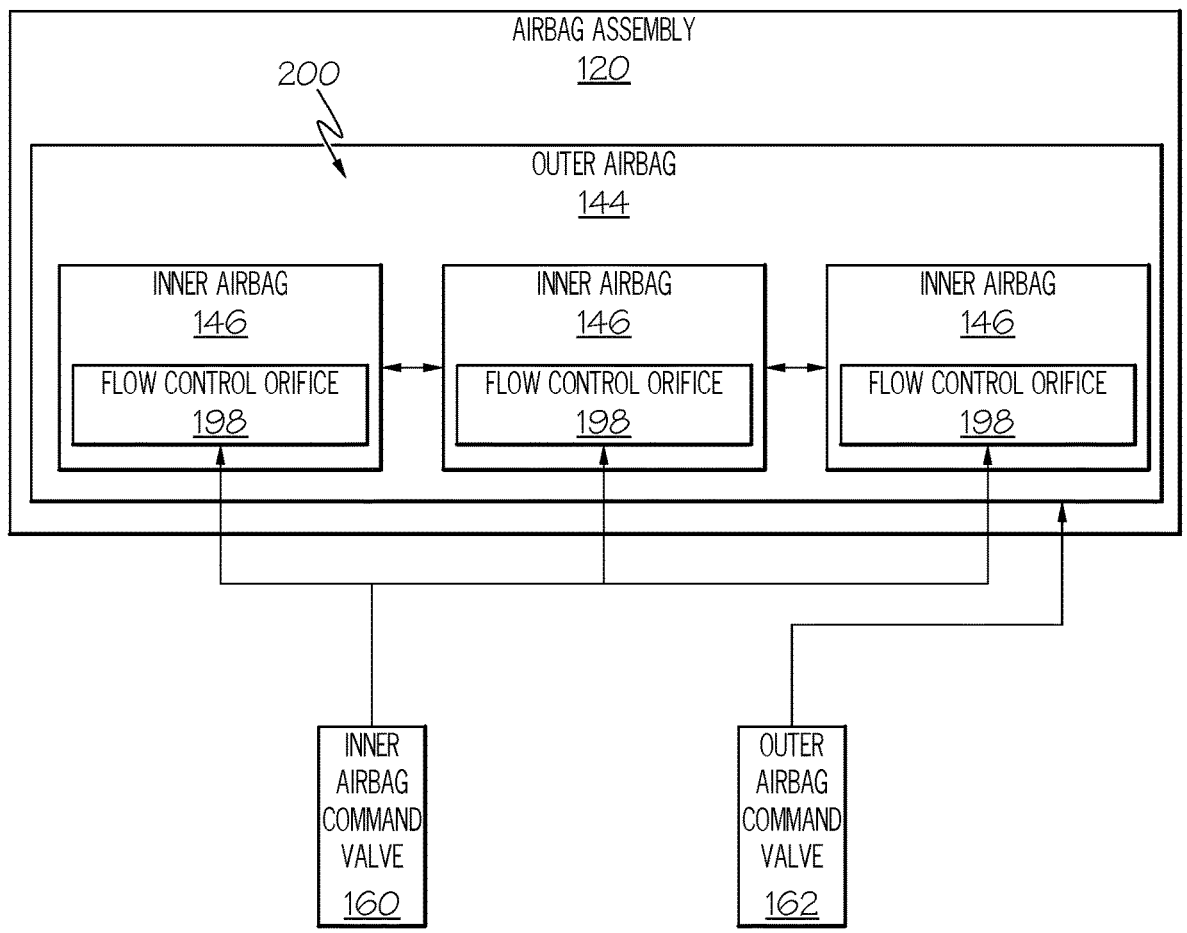
FIG. 5 is a block diagram of one embodiment of the airbag assembly of FIG. 1.

Referring to FIG. 5, airbag assembly 120 may include outer airbag 144 and plurality of inner airbags 200 positioned within (e.g., inside of) outer airbag 144. Plurality of inner airbags 200 may be fluidly coupled together. Each inner airbag 146 of plurality of inner airbags 200 may include flow control orifice 198. Inner airbag command valve 160 may be configured to control a flow of compressed gas 122 to plurality of inner airbags 200 and, thus, control a fill pressure of each inner airbag 146. Flow control orifice 198 may be configured such that each inner airbag 146 of plurality of inner airbags 200 inflate at substantially the same rate.

Figure 6:
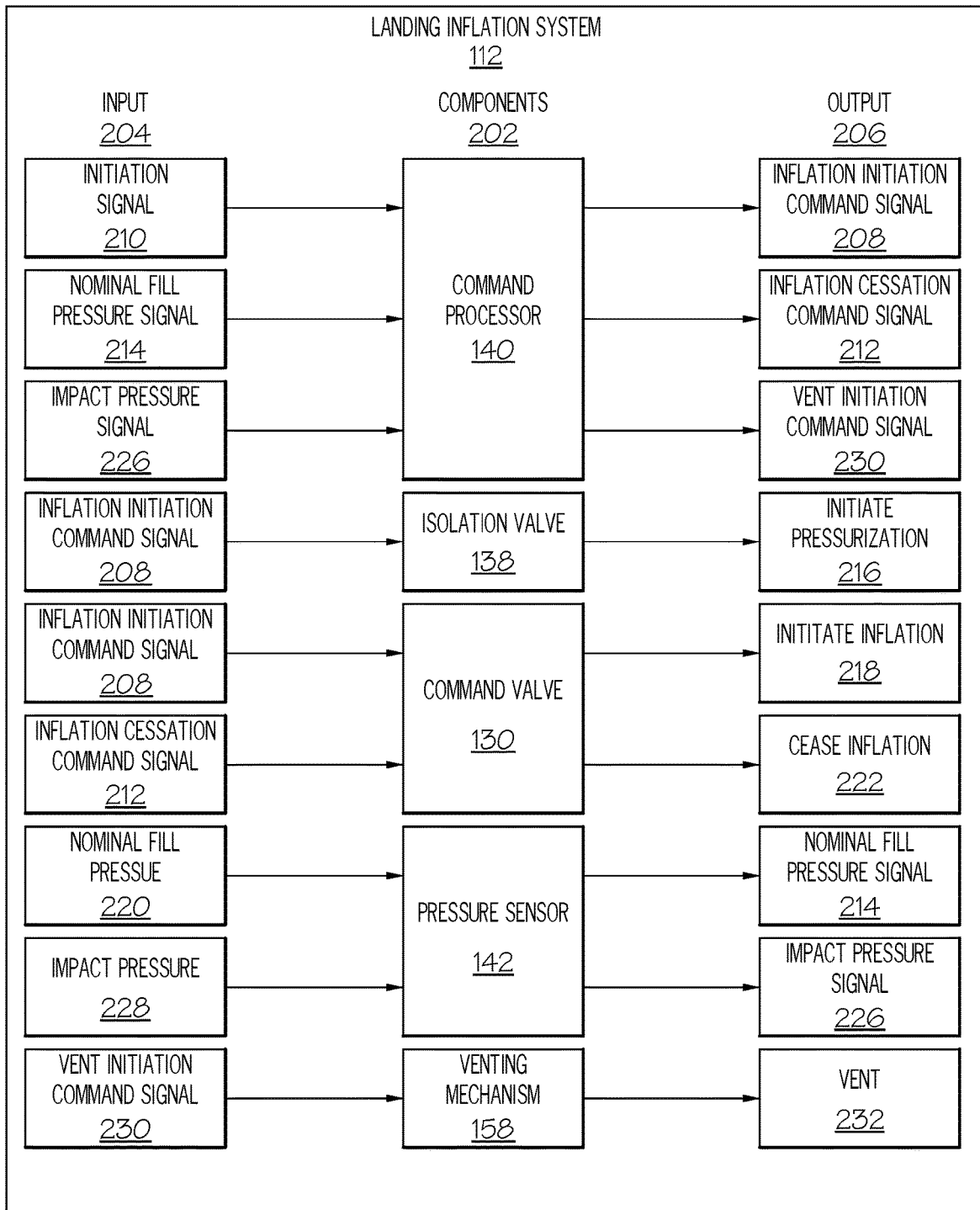
FIG. 6 is a block diagram illustrating the flow of inputs and outputs of the components of the disclosed landing inflation system of FIG. 1.

FIG. 6 illustrates components 202 of landing inflation system 112 along with various inputs 204 and outputs 206 associated with components 202. For example, component 202 may utilize input 204 to provide all or a portion of outputs 206. As is described below with respect to FIG. 6, outputs 206 from some components 202 may be used in various combinations as inputs 204 to other components 202.

Command processor 140 may be configured to generate inflation initiation command signal 208 in response to initiation signal 210. Initiation signal 210 may, for example, be generated by flight management system 134 (FIG. 1) or another system of spacecraft 100. Alternatively, initiation signal 210 may be generated manually, for example, by a crew of space capsule 102. Initiation signal 210 may be generated after deployment of parachute 110 and/or separation of heat shield 108 (FIG. 1). Command processor 140 may be configured to generate inflation initiation command signal 208, for example, at a predetermined time, altitude, capsule orientation or the like. For example, command processor 140 may include suitable logic (e.g., a timing logic) to generate inflation initiation command signal 208 at a predetermined time after deployment of parachute 110.

While not explicitly illustrated in FIG. 6, redundant command processor 186 may be similarly configured to generate inflation initiation command signal 208 (or a redundant inflation initiation command signal) in response to initiation signal 210.

Isolation valve 138 may be configured to initiate pressurization 216 of (e.g., open and distribute compressed gas 122 to) inflation assembly 114 (FIG. 1) in response to inflation initiation command signal 208. Isolation valve 138 may also be configured to protect inflation assembly 114 with fault tolerance by closing, if needed.

While not explicitly illustrated in FIG. 6, redundant isolation valve 188 may be similarly configured to initiation pressurization 216 of inflation assembly 114 in response to inflation initiation command signal 208.

Command valve 130 may be configured to initiate inflation 218 of (e.g., open and distribute compressed gas 122 to) airbag assembly 120 in response to inflation initiation command signal 208.

While not explicitly illustrated in FIG. 6, outer airbag command valve 162 may be configured to initiate inflation 218 of outer airbag 144 in response to inflation initiation command signal 208 and inner airbag command valve 160 may be configured to initiate inflation 218 of inner airbag 146 in response to inflation initiation command signal 208.

Pressure sensor 142 may be configured to generate nominal fill pressure signal 214 in response to the fill pressure of airbag assembly 120 being equal to nominal fill pressure 220. Nominal fill pressure 220 may be a predetermined pressure of airbag assembly 120 suitable to attenuate impact loads during landing and support space capsule 102 (FIG. 1) during recovery.

While not explicitly illustrated in FIG. 6, inner airbag pressure sensor 164 may be configured to generate nominal fill pressure signal 214 for inner airbag 146 in response to the fill pressure of inner airbag 146 being equal to nominal fill pressure 220 of inner airbag 146.

While not explicitly illustrated in FIG. 6, outer airbag pressure sensor 166 may be configured to generate nominal fill pressure signal 214 for outer airbag 144 in response to the fill pressure of outer airbag 144 being equal to nominal fill pressure 220 of outer airbag 144.

While not explicitly illustrated in FIG. 6, redundant outer airbag pressure sensor 190 may be configured to generate nominal fill pressure signal 214 (or a redundant nominal fill pressure signal) for outer airbag 144 in response to the fill pressure of outer airbag 144 being equal to nominal fill pressure 220 of outer airbag 144.

Command processor 140 may be further configured to generate inflation cessation command signal 212 in response to nominal fill pressure signal 214.

While not explicitly illustrated in FIG. 6, redundant command processor 186 may be similarly further configured to generate inflation cessation command signal 212 (or a redundant inflation cessation command signal) in response to nominal fill pressure signal 214.

Command valve 130 may be further configured to cease inflation 222 of (e.g., close and stop distribution of compressed gas 122 to) airbag assembly 120 in response to inflation cessation command signal 212.

While not explicitly illustrated in FIG. 6, outer airbag command valve 162 may be configured to cease inflation 222 of outer airbag 144 in response to inflation cessation command signal 212 (e.g., generated in response to nominal fill pressure signal 214 for outer airbag 144) and inner airbag command valve 160 may be configured to cease inflation 218 of inner airbag 146 in response to inflation cessation command signal 212 (e.g., generated in response to nominal fill pressure signal 214 for inner airbag 146).

Pressure sensor 142 may be further configured to generate impact pressure signal 226 in response to the fill pressure of airbag assembly 120 being equal to impact pressure 220. Impact pressure 228 may be a predetermined target pressure of airbag assembly 120 upon impact of space capsule 102 (FIG. 1).

While not explicitly illustrated in FIG. 6, outer airbag pressure sensor 166 may be configured to generate impact pressure signal 226 for outer airbag 144 in response to the fill pressure of outer airbag 144 being equal to impact pressure 228 of outer airbag 144.

While not explicitly illustrated in FIG. 6, redundant outer airbag pressure sensor 190 may be configured to generate impact pressure signal 226 (or a redundant impact pressure signal) for outer airbag 144 in response to the fill pressure of outer airbag 144 being equal to impact pressure 228 of outer airbag 144.

Command processor 140 may be further configured to generate vent initiation command signal 230 in response to impact pressure signal 226.

While not explicitly illustrated in FIG. 6, redundant command processor 186 may be similarly further configured to generate vent initiation command signal 230 (or a redundant vent initiation command signal) in response to impact pressure signal 226.

Venting mechanism 158 may be configured to vent 232 (e.g., release compressed gas 122 from) airbag assembly 120 (e.g., outer airbag 144) in response to vent initiation command signal 230.

While not explicitly illustrated in FIG. 6, vent cutter 170 may be configured to cut (e.g., release or unseal) vent 168 in response to vent initiation command signal 230 to release compressed gas 122 from outer airbag 144 and attenuate impact loads upon landing.

Figure 7:
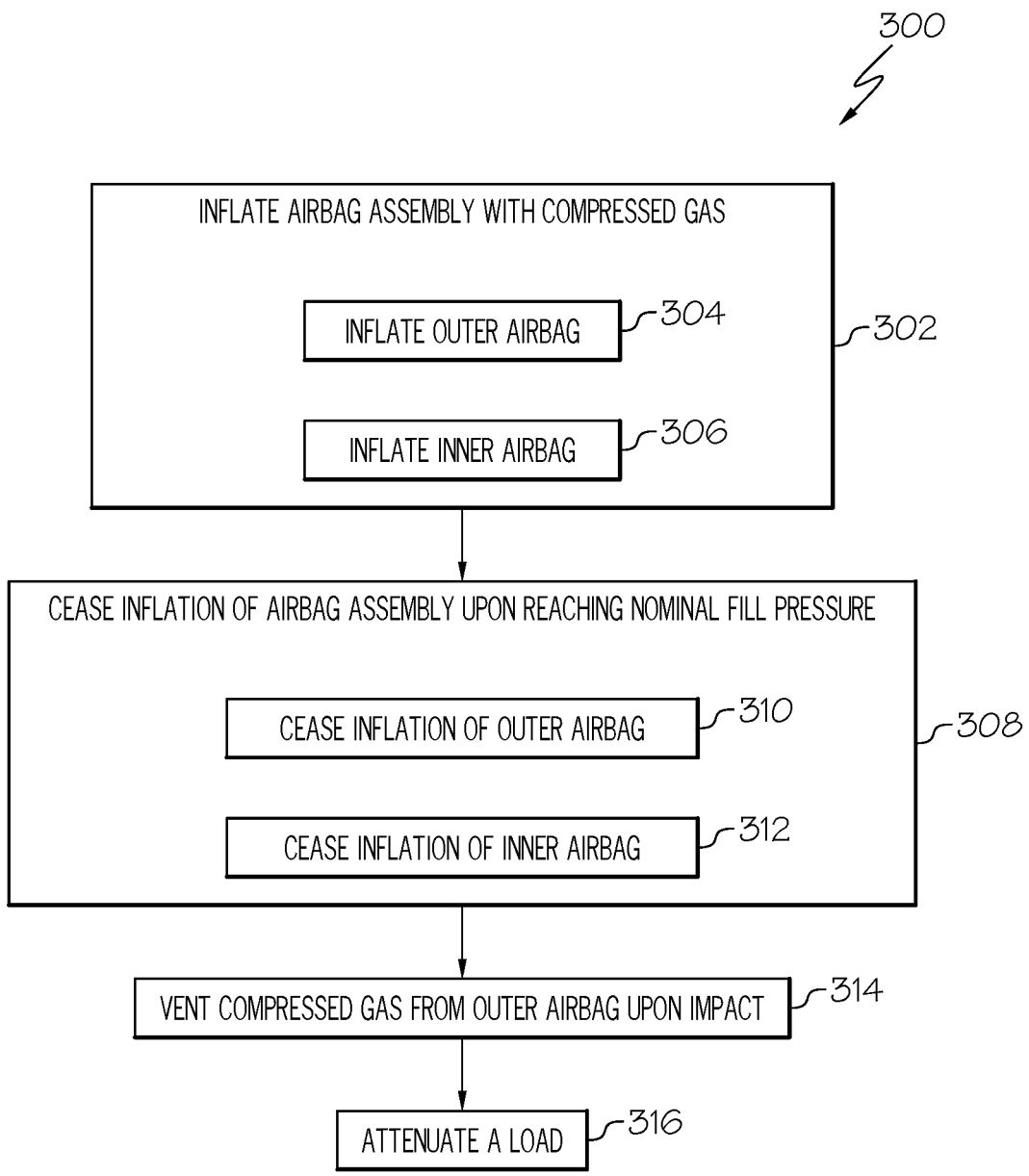
FIG. 7 is a flow diagram of one embodiment of the disclosed method for landing and recovery of a space capsule.

FIG. 7 illustrates one embodiment of the disclosed method, generally designated 300, for landing and recovery of a space capsule using a landing inflation system, for example landing and recovery operation 128 (FIG. 2).

While not explicitly illustrated in FIG. 7, method 300 may include the steps of deploying parachute 110 and separating heat shield 108 from space capsule 102 (FIG. 2) upon return to Earth.

Referring to FIG. 7, and with reference to FIG. 1, method 300 may include the step of inflating airbag assembly 120 with compressed gas 122 during descent of space capsule 102, as shown at block 302. Inflating airbag assembly 120 may include the steps of inflating outer airbag 144, as shown at block 304, and inflating inner airbag 146 positioned within outer airbag 144, as shown at block 306.

Method 300 may include the step of ceasing inflation of airbag assembly 120 upon reaching nominal fill pressure 220, as shown at block 308. Ceasing inflation of airbag assembly 120 may include the steps of ceasing inflation of outer airbag 144, as shown at block 310, and ceasing inflation of inner airbag 146, as shown at block 312.

As described herein above and with reference to FIGS. 4 and 6, outer airbag 144 may be inflated to nominal fill pressure 220 of outer airbag 144 (also referred to herein as outer nominal fill pressure), for example, via outer airbag command valve 162 in response to inflation initiation command signal 208 for outer airbag 144 (also referred to herein as outer inflation initiation command signal) and inflation cessation command signal 212 for outer airbag 144 (also referred to herein as outer inflation cessation command signal). Similarly, inner airbag 146 may be inflated to nominal fill pressure 220 of inner airbag 146 (also referred to herein as inner nominal fill pressure), for example, via inner airbag command valve 160 in response to inflation initiation command signal 208 for inner airbag 146 (also referred to herein as inner inflation initiation command signal) and inflation cessation command signal 212 for inner airbag 146 (also referred to herein as inner inflation cessation command signal).

Method 300 may include the step of venting compressed gas 122 from outer airbag 144 upon impact of space capsule 102 with ground surface 126, as shown at block 314.

Method 300 may include the step of attenuating a load in response to a landing impact, as shown at block 316.

Modifications, additions, or omissions may be made to the methods disclosed herein without departing from the scope of the present disclosure. The methods may include more, fewer, or other steps. Additionally, steps may be performed in any suitable order.

Although various embodiments of the disclosed systems and methods have been shown and described, modifications may occur to those skilled in the art upon reading the specification. The present application includes such modifications and is limited only by the scope of the claims.

What is claimed is:

1. An inflation system comprising:
   a compressed gas source;
   an isolation valve located fluidly downstream of said compressed gas source and fluidly coupled with said compressed gas source;
   a manifold located fluidly downstream from said isolation valve and fluidly coupled with said isolation valve;
   a plurality of command valves located fluidly downstream from said manifold and fluidly coupled with said manifold; and
   a bleed orifice fluidly coupled with said manifold between said isolation valve and said plurality of command valves, wherein said bleed orifice automatically equalizes pressure in said manifold between said isolation valve and said plurality of command valves prior to pressurization of said manifold with compressed gas from said compressed gas source.

2. The inflation system of claim 1 further comprising a command processor in communication with the isolation valve and the plurality of command valves,
   wherein said command processor generates inflation initiation command signals in response to an initiation signal;
   wherein said command processor generates inflation cessation command signals in response to first pressure signals; and
   wherein said command processor generates vent command signals in response to second pressure signals.

3. The inflation system of claim 2 further comprising a plurality of pressure sensors, each pressure sensor of said plurality of pressure sensors being located fluidly downstream from an associated command valve of said plurality of command valves, wherein said plurality of pressure sensors are in communication with said command processor.

4. The inflation system of claim 3 wherein said plurality of command valves are configured to open and allow said compressed gas from said compressed gas source to pass therethrough in response to said inflation initiation command signals.

5. The inflation system of claim 4 wherein said plurality of command valves are configured to close in response to said inflation cessation command signals.

6. The inflation system of claim 3 wherein said plurality of pressure sensors generate said first pressure signals when a first predefined target pressure is detected downstream of said plurality of command valves.

7. The inflation system of claim 6 wherein said plurality of pressure sensors generate said second pressure signals when a second predefined target pressure is detected downstream of said plurality of command valves.

8. The inflation system of claim 3 further comprising at least one redundancy configured to accommodate a failure mode of one or more of said command processor, said plurality of command valves and said plurality of pressure sensors.

9. The inflation system of claim 2 further comprising an airbag assembly located fluidly downstream from said plurality of command valves and fluidly coupled with said plurality of command valves.

10. The inflation system of claim 9 wherein said airbag assembly comprises:
an outer airbag fluidly coupled with one command valve of said plurality of command valves to receive a first portion of said compressed gas; and
an inner airbag positioned within said outer airbag and fluidly coupled with another command valve of said plurality of command valves to receive a second portion of said compressed gas.

11. The inflation system of claim 10 wherein said inner airbag is fluidly coupled with said outer airbag.

12. The inflation system of claim 10 wherein said airbag assembly further comprises a venting mechanism operably coupled to said outer airbag and communicatively coupled to said command processor, and wherein said venting mechanism is configured to vent said first portion of said compressed gas from said outer airbag in response to said vent command signal.

13. A spacecraft comprising:
a space capsule; and
the inflation system of claim 1 associated with said space capsule.

14. The spacecraft of claim 13 further comprising an airbag assembly located fluidly downstream from said plurality of command valves and fluidly coupled with said plurality of command valves.

15. The spacecraft of claim 14 wherein said airbag assembly comprises:
an outer airbag fluidly coupled with one command valve of said plurality of command valves to receive a first portion of said compressed gas; and
an inner airbag positioned within said outer airbag and fluidly coupled with another command valve of said plurality of command valves to receive a second portion of said compressed gas.

16. The spacecraft of claim 13 further comprising a heat shield connected to said space capsule.

17. The spacecraft of claim 13 further comprising a parachute connected to said space capsule.

18. An inflation method comprising:
automatically equalizing pressure in a manifold, located between and fluidly coupled with an isolation valve and a plurality of command valves, using a bleed orifice fluidly coupled with said manifold between said isolation valve and said plurality of command valves;
generating, by a command processor, a first inflation initiation command signal;
actuating, by said command processor, said isolation valve, fluidly coupled to a compressed gas source, in response to said first inflation initiation command signal; and
pressurizing said manifold, located fluidly downstream from and fluidly coupled to said isolation valve, with said compressed gas.

19. The inflation method of claim 18, further comprising:
generating, by said command processor, a second inflation initiation command signal following pressurization of said manifold;
actuating, by said command processor, said plurality of command valves, located fluidly downstream from and fluidly coupled to said manifold, to open said plurality of command valves and allow said compressed gas to pass therethrough in response to said second inflation initiation command signal;
measuring, by a plurality of pressure sensors, pressure downstream of said plurality of command valves;
generating, by each one of said plurality of pressure sensors, first pressure signals when a first predefined target pressure is detected downstream of said plurality of command valves;
generating, by said command processor, inflation cessation command signals in response to said first pressure signals; and
actuating, by said command processor, said plurality of command valves to close in response to said inflation cessation command signals.

20. The inflation method of claim 19 further fluidly coupling an airbag assembly with said plurality of command valves.

21. The inflation method of claim 19 further comprising:
generating, by each one of said plurality of pressure sensors, second pressure signals when a second predefined target pressure is detected downstream of said plurality of command valves, said second predefined target pressure being greater than said first predefined target pressure; and
generating, by said command processor, vent command signals in response to said second pressure signals.

* * * * *